(12) United States Patent
Young et al.

(10) Patent No.: US 10,171,171 B2
(45) Date of Patent: Jan. 1, 2019

(54) METHOD AND SYSTEM FOR SELECTABLE PARALLEL OPTICAL FIBER AND WAVELENGTH DIVISION MULTIPLEXED OPERATION

(71) Applicant: Luxtera, Inc., Carsbad, CA (US)

(72) Inventors: Greg Young, Irvine, CA (US); Peter DeDobbelaere, San Diego, CA (US)

(73) Assignee: Luxtera, Inc., Carlsbad, CA (US)

( * ) Notice: Subject to any disclaimer, the term of this patent is extended or adjusted under 35 U.S.C. 154(b) by 0 days.

(21) Appl. No.: 15/642,763

(22) Filed: Jul. 6, 2017

(65) Prior Publication Data

US 2018/0013494 A1 Jan. 11, 2018

Related U.S. Application Data

(60) Provisional application No. 62/359,408, filed on Jul. 7, 2016.

(51) Int. Cl.
| | |
|---|---|
| *H04J 14/04* | (2006.01) |
| *H04J 14/02* | (2006.01) |
| *H04B 10/00* | (2013.01) |
| *H04B 10/40* | (2013.01) |
| *G02B 6/30* | (2006.01) |

(Continued)

(52) U.S. Cl.
CPC ............. *H04B 10/40* (2013.01); *G02B 6/12* (2013.01); *G02B 6/30* (2013.01); *G02B 6/4204* (2013.01);

(Continued)

(58) Field of Classification Search
None
See application file for complete search history.

(56) References Cited

U.S. PATENT DOCUMENTS 9,341,786 B1 * 5/2016 Gamache ................. G02B 6/30
9,768,901 B2 * 9/2017 Soldano .................... G02B 6/30
(Continued)

OTHER PUBLICATIONS

Yamazaki et al., Modulation-level-selectable Optical Modulator with a Hybrid Configuration of Silica PLCs and LiNbO3 Phase Modulators, 2010, IEEE.*

(Continued)

*Primary Examiner* — Ken N Vanderpuye
*Assistant Examiner* — Jai Lee
(74) *Attorney, Agent, or Firm* — McAndrews, Held & Malloy Ltd.

(57) ABSTRACT

Methods and systems for selectable parallel optical fiber and WDM operation may include an optoelectronic transceiver integrated in a silicon photonics die. The optoelectronic transceiver may, in a first communication mode, communicate continuous wave (CW) optical signals from an optical source module to a first subset of optical couplers on the die for processing signals in optical modulators in accordance with a first communications protocol, and in a second communication mode, communicate the CW optical signals to a second subset of optical couplers for processing signals in the optical modulators in accordance with a second communications protocol. Processed signals may be transmitted out of the die utilizing a third subset of the optical couplers. First or second protocol optical signals may be received from the fiber interface coupled to a fourth subset or a fifth subset, respectively, of the optical couplers.

20 Claims, 6 Drawing Sheets

(51) Int. Cl.
  *H04B 10/2581* (2013.01)
  *H04B 10/80* (2013.01)
  *H04L 29/06* (2006.01)
  *G02B 6/42* (2006.01)
  *G02B 6/12* (2006.01)
  *H04B 10/43* (2013.01)

(52) U.S. Cl.
  CPC ........... *G02B 6/425* (2013.01); *G02B 6/4213* (2013.01); *G02B 6/4215* (2013.01); *G02B 6/4246* (2013.01); *H04B 10/2581* (2013.01); *H04B 10/802* (2013.01); *H04J 14/02* (2013.01); *H04J 14/0202* (2013.01); *H04J 14/04* (2013.01); *H04L 69/18* (2013.01); *H04B 10/43* (2013.01)

(56) References Cited

U.S. PATENT DOCUMENTS

| | | | | |
|---|---|---|---|---|
| 9,819,420 | B2 * | 11/2017 | Wen | H04B 10/532 |
| 2002/0021464 | A1 * | 2/2002 | Way | H04B 10/50 |
| | | | | 398/79 |
| 2013/0322809 | A1 * | 12/2013 | Goh | H04B 10/5161 |
| | | | | 385/3 |
| 2014/0328591 | A1 * | 11/2014 | Koch | H04B 10/506 |
| | | | | 398/49 |
| 2014/0328601 | A1 * | 11/2014 | Cavaliere | H04B 10/5053 |
| | | | | 398/188 |
| 2016/0036550 | A1 * | 2/2016 | Welch | H04J 14/02 |
| | | | | 398/87 |
| 2017/0059796 | A1 * | 3/2017 | Huang | G02B 6/4251 |
| 2017/0141869 | A1 * | 5/2017 | Welch | H04J 14/02 |

OTHER PUBLICATIONS

Fiber Optic Components, for 40GBase-LR4 QSFP+ Transceiver Link:CWDM or PSM, Feb. 2016.*

European Search Report Application No. 17180287.9-1874 dated Sep. 11, 2017.

International Search Report and Written Opinion of the International Searching Authority, Application No. PCT/US2017/049887 dated Nov. 28, 2017.

* cited by examiner

METHOD AND SYSTEM FOR SELECTABLE PARALLEL OPTICAL FIBER AND WAVELENGTH DIVISION MULTIPLEXED OPERATION

CROSS-REFERENCE TO RELATED APPLICATIONS/INCORPORATION BY REFERENCE

This application claims priority to and the benefit of U.S. Provisional Application No. 62/359,408 filed on Jul. 7, 2016, which is hereby incorporated herein by reference in its entirety.

FIELD

Certain embodiments of the disclosure relate to semiconductor photonics. More specifically, certain embodiments of the disclosure relate to a method and system for selectable parallel optical fiber and wavelength division multiplexing (WDM) operation.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method for selectable parallel optical fiber and WDM operation, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

Figure 1A:
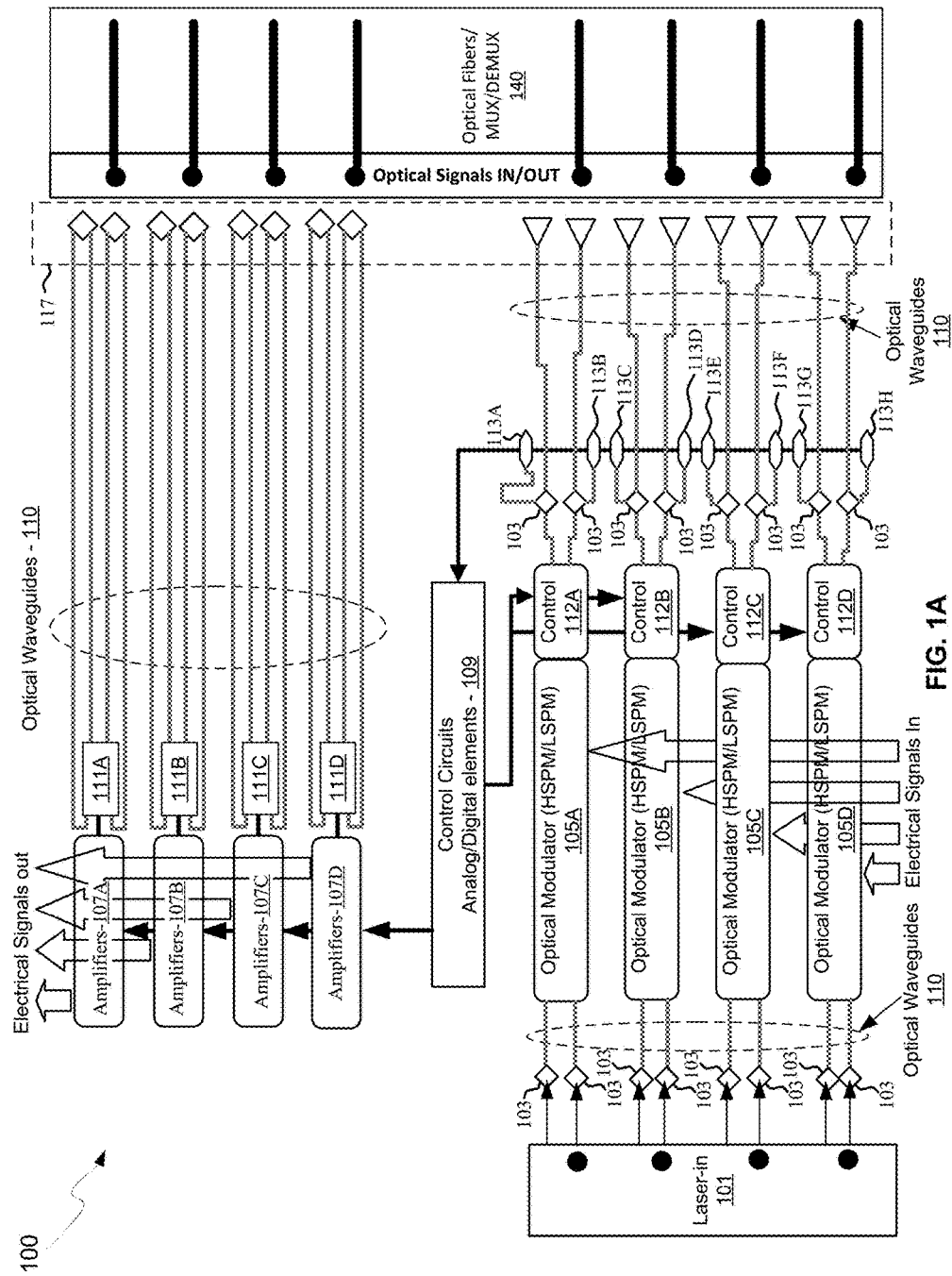
FIG. 1A is a block diagram of a photonically-enabled integrated circuit with selectable parallel optical fiber and WDM operation, in accordance with an example embodiment of the disclosure.

FIG. 1A is a block diagram of a photonically-enabled integrated circuit with selectable parallel optical fiber and WDM operation, in accordance with an example embodiment of the disclosure. Referring to FIG. 1A, there is shown optoelectronic devices on a photonic circuit 100 comprising optical modulators 105A-105D, photodiodes 111A-111D, monitor photodiodes 113A-113H, and optical devices comprising input couplers 103, and input/output couplers 117. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

In an example scenario, the photonic circuit 100 comprises a CMOS photonics die and one or more electronics die coupled to the photonics die, with an optical source assembly 101 coupled to the top surface of the photonic IC 100 or remotely from the photonics and electronics die. The optical source assembly 101 may comprise one or more semiconductor lasers with isolators, lenses, and/or polarization rotators for directing one or more CW optical signals to the couplers 103. In an example scenario, the optical source assembly may be located remotely from the photonic and electronics die and optical fibers may communicate the optical signals to the couplers 103. In this scenario, optical and optoelectronics functions may be performed on the photonics die and electronics functions may be performed on the electronics die. In another example scenario, the photonically enabled integrated circuit 100 may comprise a single chip.

Optical signals are communicated between optical and optoelectronic devices via optical waveguides 110 fabricated in the photonic circuit 100. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and within the scope of the disclosure.

In an example scenario, the couplers 103 may comprise grating couplers, for top surface coupling or end facets for edge coupling, for receiving input optical signals from the laser assembly 101. Each of the pairs of couplers 103 that receive optical source signals from the laser assembly 101 may be utilized for a different optical communication standard, such as parallel optical fiber (e.g., PSM-4) and WDM, which may include coarse WDM and dense WDM, such that each modulator input is for sourcing a different standard or protocol. Therefore, by aligning the laser assembly 101 to a particular set of couplers 103, the protocol or standard communicated via the transceivers of the photonic integrated circuit 130 may be configured and a different chip is not needed for different protocols.

The optical modulators 105A-105D comprise Mach-Zehnder or ring modulators, for example, and enable the modulation of the continuous-wave (CW) laser input signals. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

In an example scenario, the high-speed optical phase modulators may operate based on the free carrier dispersion effect and may demonstrate a high overlap between the free carrier modulation region and the optical mode. High-speed phase modulation of an optical mode propagating in a waveguide is the building block of several types of signal encoding used for high data rate optical communications. Speed in the tens of Gb/s may be required to sustain the high data rates used in modern optical links and can be achieved in integrated Si photonics by modulating the depletion region of a PN junction placed across the waveguide carrying the optical beam. In order to increase the modulation efficiency and minimize the loss, the overlap between the optical mode and the depletion region of the PN junction is optimized.

The outputs of the optical modulators 105A-105D may be optically coupled via the waveguides 110 to a subset of the optical couplers 117. The couplers 103 at the outputs of the modulators 105A-105D may comprise four-port optical couplers, for example, and may be utilized to sample or split the optical signals generated by the optical modulators 105A-105D, with the sampled signals being measured by the monitor photodiodes 113A-113H. The unused branches of the directional couplers 103D-103K may be terminated by optical terminations, for example, to avoid back reflections of unwanted signals.

The optical couplers 117 may comprise optical gratings that enable coupling of light into and out of the top surface of the photonic circuit 100 or may comprise end facets for edge coupled optical signals. The optical couplers 117 may be utilized to couple light received from optical fibers 149 into the photonic circuit 100, and the optical couplers 117 may be utilized to couple light from the photonic circuit 100 into optical fibers. The optical couplers 117 may comprise single polarization grating couplers (SPGC) and/or polarization splitting grating couplers (PSGC). In instances where a PSGC is utilized, two input, or output, waveguides may be utilized, such as those coupled to the photodiodes 111A-111D.

The optical fibers may be bonded by adhesive, for example, to the chip comprising the optical and optoelectronic sections of the photonic integrated circuit 130, and may be aligned at an angle from normal to the surface of the chip to optimize coupling efficiency. In an example embodiment, the optical fibers may comprise single-mode fiber (SMF) and/or polarization-maintaining fiber (PMF).

Figure 1B:
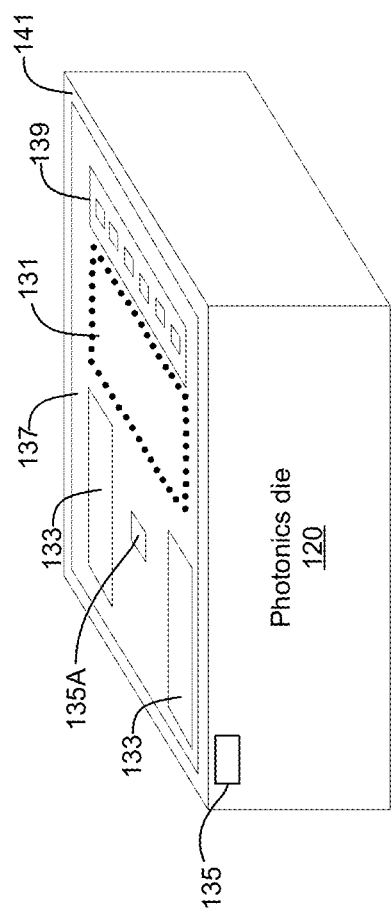
FIG. 1B is a diagram illustrating an exemplary photonically-enabled die, in accordance with an example embodiment of the disclosure.

In another example embodiment illustrated in FIG. 1B, optical signals may be communicated directly into the surface of a photonics die in the photonic circuit 100 without optical fibers by directing a light source on an optical coupling device in the chip, such as the light source interface 135 and/or the optical fiber interface 139. This may be accomplished with laser sources on another chip flip-chip bonded to the die.

The photodiodes 111A-111D may convert optical signals received from the optical couplers 117 into electrical signals that are communicated to the amplifiers 107A-107D for processing. In an example scenario, the photodiodes 111A-111D comprise multi-port photodetectors capable of receiving from either of each pair of optical couplers 117 as shown. In this manner, different standard or communication protocol optical signals may be communicated via the optical fibers 149 into the optical couplers 117, where each grating coupler in a pair of couplers may be configured for a particular communications protocol or standard, such as WDM and parallel optical fiber, for example. For example, one of each pair of optical couplers 117 may be configured to receive 1310 nm optical signals for PSM-4, while the other of each pair may be configured for a different WDM wavelength, such as 1270, 1290, 1310, and 1330 nm, for use with CWDM, or more fine wavelength spacing for DWDM. Other wavelengths are also possible, such as in the range of 1550 nm, for example, depending on the communication standard, type of fiber, and optical sources.

In accordance with an example embodiment of the disclosure, in a receiver subsystem implemented in a silicon chip, light is often coupled into a photodetector via a polarization-splitting grating coupler that supports coupling all polarization states of the fiber mode efficiently. The incoming signal is split by the PSGC into two separate waveguides in a polarization-diversity scheme, and therefore both inputs to the waveguide photodetectors are used. If two different PSGCs are used to couple into the same photodetector, then the PD has four separate waveguide ports.

The analog and digital control circuits 109 may control gain levels or other parameters in the operation of the amplifiers 107A-107D, which may then communicate electrical signals off the photonic circuit 100. The control sections 112A-112D comprise electronic circuitry that enable modulation of the CW laser signal received from the splitters 103A-103C. The optical modulators 105A-105D may require high-speed electrical signals to modulate the refractive index in respective branches of a Mach-Zehnder interferometer (MZI), for example.

In operation, the photonic circuit 100 may be operable to transmit and/or receive and process optical signals. Optical signals may be received from optical fibers by the optical couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the photonic circuit 100.

Integrated photonics platforms allow the full functionality of an optical transceiver to be integrated on a single chip or optical/optoelectronics functionality on a photonics die and electronics functionality on an electronics die, with the die directly bonded for high speed operation. An optical transceiver chip contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths, and equalizing signals for reducing and/or eliminating inter-symbol interference (ISI), which may be a common impairment in optical communication systems.

The photonic circuit 100 may comprise a single electronics/photonics CMOS die/chip or may comprise separate CMOS die for the photonics and electronics functions. The photonic circuit 100 may support both parallel optical fiber (such as PSM-4) and wavelength-division multiplexed (such as CWDM) operation. Selection between the two modes of operation may be enabled by the alignment of the fiber interfaces for both the external light source, the optical source assembly 101, and an external MUX/DEMUX/optical fibers 140, with the MUX/DEMUX operation configured at the firmware level, such as in the control circuits 109. Four-port high-speed photodetectors may enable the dual operation of the photonic circuit 100.

FIG. 1B is a diagram illustrating an exemplary photonically-enabled die, in accordance with an example embodiment of the disclosure. Referring to FIG. 1B, there is shown the photonically-enabled die 120 comprising an electronic die interface 131, optical and optoelectronic devices 133, a light source interface 135, a chip front surface 137, an optical fiber interface 139, and CMOS guard ring 141.

In one embodiment, the light source interface 135A and the optical fiber interface 139 comprise grating couplers, for example, that enable coupling of light signals via the CMOS chip surface 137, as opposed to the edges of the chip as with conventional edge-emitting/receiving devices. However, end facets may be used to couple optical signals into the edges of the photonics die 120, as in indicated by the light source interface 135B comprising an end facet on the side of the photonics die 120. Coupling light signals via the chip surface 137 enables the use of the CMOS guard ring 141 which protects the chip mechanically and prevents the entry of contaminants via the chip edge. However, the disclosure is not limited to surface coupling, as edge couplers, such as light source 135B comprising end facets may be utilized to communicate signals into and out of the photonics IC 130.

The electronics die interface 131 may comprise electrical contacts, such as bond pads and bumps or pillars for coupling to one or more electronics die. The optical and optoelectronic devices 133 comprise devices such as the couplers 103A-103K, optical couplers 117A, optical modulators 105A-105D, high-speed heterojunction photodiodes 111A-111D, and monitor photodiodes 113A-113I.

Figure 1C:
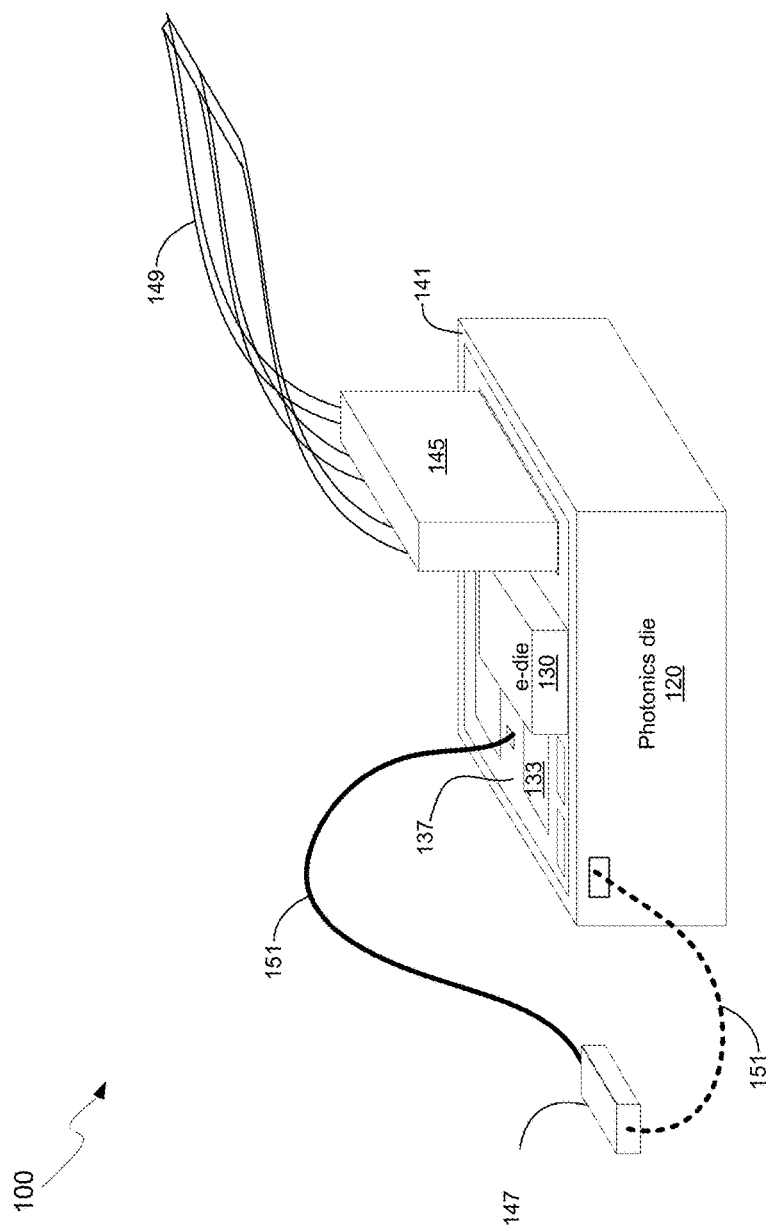
FIG. 1C is a diagram illustrating a photonically-enabled integrated circuit with an optical fiber cable, in accordance with an example embodiment of the disclosure.

FIG. 1C is a diagram illustrating a photonically-enabled integrated circuit coupled to an optical fiber cable, in accordance with an example embodiment of the disclosure. Referring to FIG. 1C, there is shown the photonic circuit 100 comprising an electronics die 130 coupled to the photonics die 120. There is also shown a fiber-to-chip coupler 145, an optical fiber cable 149, and an optical source assembly 147. In an example scenario, the optical source assembly 147 may be remote from the photonics die 120 with optical signals coupled to the optical couplers via optical fibers. The light source assembly 147 may then couple optical signals into the top surface 137 via light source interface 135A or into the edge of the photonics die 120 via light source interface 135B comprising an end facet, as indicated by the dashed optical fiber 151. Furthermore, the electronics die 130 may be coupled to the photonics IC 120 to perform some or all of the electronic functions of the photonic circuit 100*in*.

The electronics die 120 may comprise comprise circuitry such as the amplifiers 107A-107D and the analog and digital control circuits 109 described with respect to FIG. 1A, for example.

The photonic circuit 100 comprises the optical and optoelectronic devices 133, the light source interfaces 135A and 135B, the chip surface 137, and the CMOS guard ring 141 may be as described with respect to FIG. 1B. The optical source assembly 147 may comprise a plurality of lasers, with 1310 nm wavelength and wavelengths ranging from 1270 nm to 1330 to support both PSM-4 and CWDM operation, for example, although other WDM and parallel fiber channel wavelengths may be used.

In an example embodiment, the optical fiber cable 149 may be affixed, via epoxy for example, to the CMOS chip surface 137. The fiber chip coupler 145 enables the physical coupling of the optical fiber cable 149 to the photonics die 120. In another example scenario, the photonic circuit 100 may comprise photonic devices on one die, such as a photonics interposer, and electrical devices on one or more electronics die, both of which may comprise CMOS die.

Figure 2:
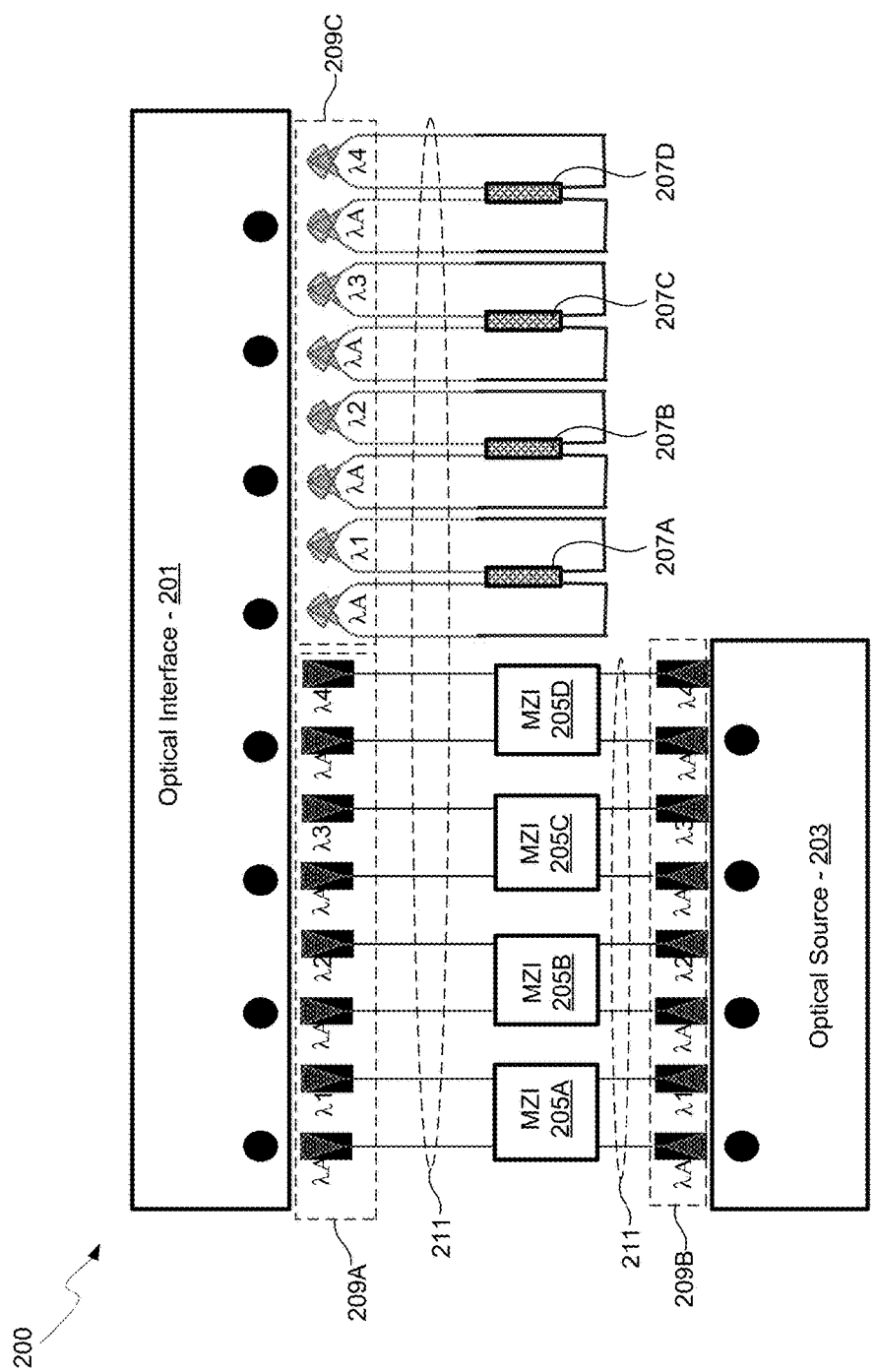
FIG. 2 illustrates an optical transceiver with optical paths in parallel optical fiber mode, in accordance with an example embodiment of the disclosure.

FIG. 2 illustrates an optical transceiver with optical paths in PSM-4 mode, in accordance with an example embodiment of the disclosure. Referring to FIG. 2, there is shown an optical transceiver 200 comprising four MZI modulators 205A-205D, a fiber array optical interface 201, an external optical source array 203, grating couplers 209A-209C, optical waveguides 211, and 4-port high-speed photodiodes 207A-207D. Multi-port photodiodes are described in detail in U.S. patent application Ser. No. 15/592,774 filed on May 11, 2017, which is hereby incorporated by reference in its entirety. The optical and optoelectronic devices shown in FIG. 2 may be integrated on a photonics chip, such as a silicon photonics interposer, for example, upon which other structures, such as electronics die, fiber arrays, and light source assemblies, may be bonded.

The grating couplers 209A-209C may comprise single-polarization grating couplers, such as grating couplers 209A-209B, or polarization-splitting grating couplers (PS- GCs) 209C, where two optical signals may be communicated to different inputs of the photodiodes 207A-207D.

The external optical source array 203 may comprise an array of lasers in a light source assembly with a plurality of output ports that may be aligned to desired grating couplers 209B on the photonics die, depending on the mode of operation, parallel optical fiber (e.g., PSM-4) or WDM (e.g., CWDM), for example. In an example scenario, the external optical source array 203 may comprise a fiber array that communicates optical signals from an array of source lasers external to the photonics die that may be aligned to desired grating couplers 209B on the photonics die. For example, grating couplers 209A-209C labeled $\lambda A$ may be utilized for PSM-4 wavelengths, and grating couplers 209A-209C labeled $\lambda 1$-$\lambda 4$ may be for different CWDM wavelengths.

The fiber array optical interface 201 may couple optical fibers to desired grating couplers 209A and PSGCs 209C on the photonics chip, depending on the desired mode of operation. In an example scenario, the optical interface may comprise a fiber for each coupler/PSGC on the die, where a MUX/DEMUX, as shown further with respect to FIG. 4. The PLC may be integrated on a planar lightwave circuit (PLC), for example, in the fiber array optical interface 201, may be utilized to select which fiber is used to couple optical signals to and from the die. Planar lightwave circuits are described in more detail in U.S. Pat. No. 7,366,380, which is hereby incorporated by reference in its entirety. In this manner, the optical interface 201 and optical source array 203 may be shifted laterally with respect to the grating couplers 209A-209C to switch to CWDM mode.

FIG. 2 illustrates a parallel optical fiber mode of the optical transceiver 200, where 1310 nm CW optical signals, for PSM-4, for example, are communicated to the die via the external optical source array 203. Accordingly, the output ports of the external light source fiber array that are coupled to $\lambda A$ (e.g., 1310 nm) grating couplers may be selected by a MUX or other switching apparatus. The CW signals may then be modulated using the MZI modulators 205A-205D and communicated out of the chip via the associated grating couplers 209A coupled to the fiber array optical interface 201.

Similarly, modulated 1310 nm signals may be received from the fiber array optical interface 201 via the PSGCs 209C and communicated to the 4-port high-speed photodiodes 207A-207D, where electrical signals may be generated that represent the data modulated in the received optical signals. In another example scenario, the transceiver may be configured in PSM-4 mode by fixing the fiber array optical interface 201 and external optical source array 203 to be coupled to appropriate grating couplers 209A and 209B and PSGCs 209C without further switching of mode. The modulation/demodulation scheme would then be set for PSM-4 operation upon manufacture, for example.

Figure 3:
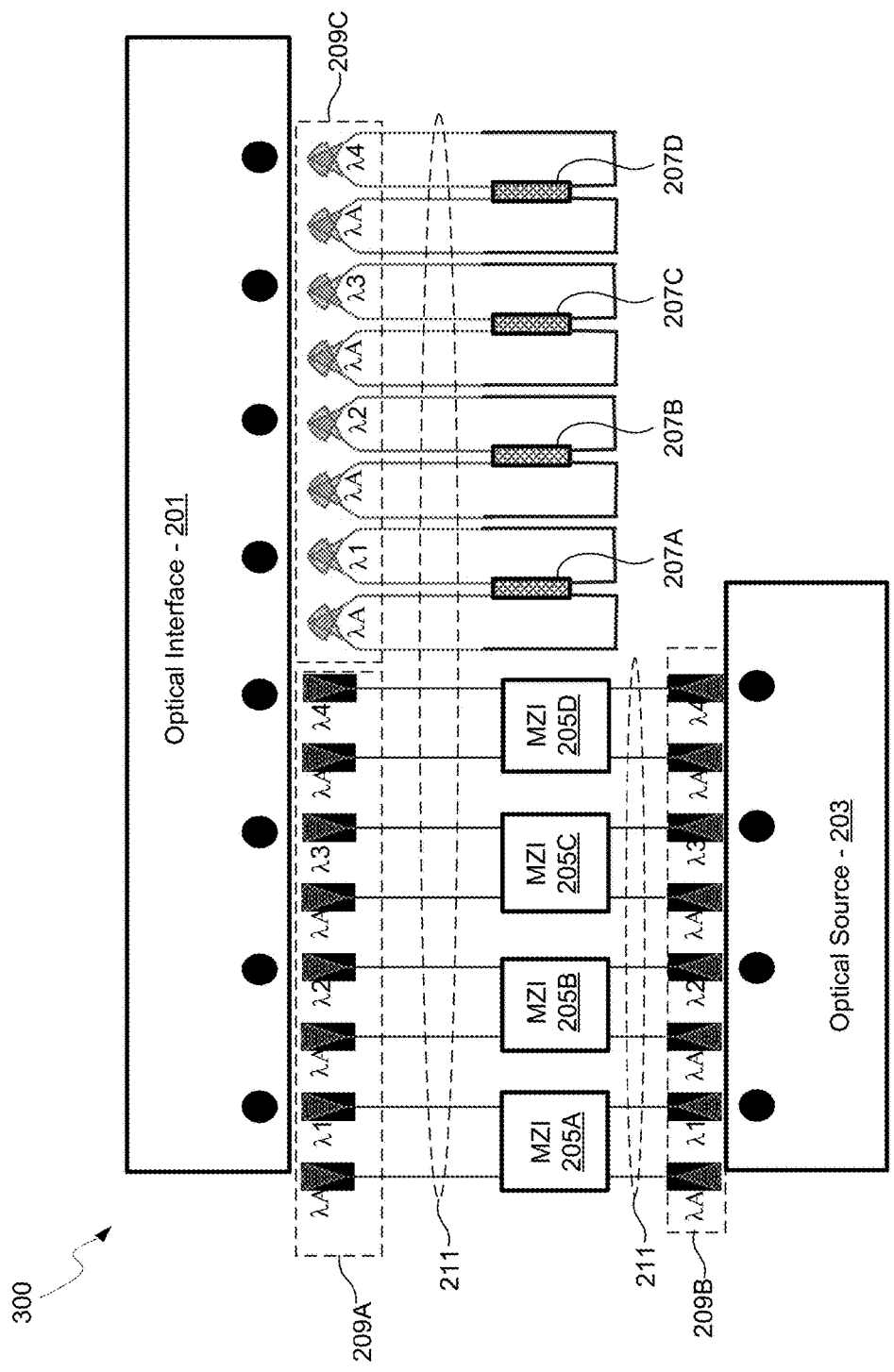
FIG. 3 illustrates an optical transceiver with optical paths in WDM mode, in accordance with an example embodiment of the disclosure.

FIG. 3 illustrates an optical transceiver with optical paths in WDM mode, in accordance with an example embodiment of the disclosure. Referring to FIG. 3, there is shown the optical transceiver 300 in WDM mode, as compared to the parallel optical fiber mode of FIG. 2. As stated above, the transceiver 300 comprises four MZI modulators 205A-205D, a fiber array optical interface 201, an external optical source array 203, grating couplers 209A-209C, and 4-port high-speed photodiodes 207A-207D. Although four channels are shown in FIG. 3, the disclosure is not so limited, as any number of channels may be utilized.

The external optical source array 203 may comprise an array of lasers in a light source assembly with a plurality of output ports that may be aligned to desired grating couplers on the photonics die for WDM mode. Accordingly, laser sources of different WDM wavelengths, such as CWDM wavelengths ranging from 1270 nm to 1330 nm, for example, may be coupled to appropriate grating couplers 209B labeled $\lambda 1$-$\lambda 4$ on the photonics die.

The fiber array optical interface 201 may couple optical fibers to desired grating couplers 209A and 209B and PSGCs 209C on the photonics chip, depending on the desired mode of operation. In an example scenario, the optical interface 201 may comprise a fiber for each coupler/PSGC on the die, where a MUX/DEMUX may be utilized to select which fiber is used to couple optical signals to and from the die, shown further with respect to FIG. 4. Alternatively, a more fixed configuration of the standard/protocol configuration comprises fixing the output ports of the fiber array optical interface 201 and optical source assembly 203 to the desired grating couplers 209A-209C, where the fiber array optical interface 201 and optical source assembly 203 have half the total amount of couplers 209A-209C on the die.

FIG. 3 illustrates a WDM mode of the optical transceiver 300, where 1270 nm to 1330 nm CW optical signals may be communicated to the die via the external light source fiber array 203. Accordingly, the output ports of the external light source fiber array 203 that are coupled to desired wavelength grating couplers may be selected by a DEMUX or other switching apparatus that route optical signals to desired grating couplers. Alternatively, output ports of the external light source fiber array 203 may be affixed to the grating couplers 209B for the desired protocol/standard. The CW signals may then be modulated using the MZI modulators 205A-205D and communicated out of the chip via the associated grating couplers 209A coupled to the fiber array optical interface 201.

Similarly, modulated $\lambda 1$-$\lambda 4$ wavelength, e.g., 1270 nm to 1330 nm signals, may be received from the fiber array optical interface 201 via corresponding wavelength PSGCs 209B and communicated to the 4-port high-speed photodiodes 207A-207D where electrical signals may be generated that represent the data modulated in the received optical signals. In another example scenario, the transceiver may be configured in WDM mode by fixing the fiber array optical interface 201 and external light source fiber array 203 to appropriate grating couplers 209A-209C without further switching of mode. The modulation/demodulation scheme would then be set for CWDM operation upon manufacture, for example.

Figure 4:
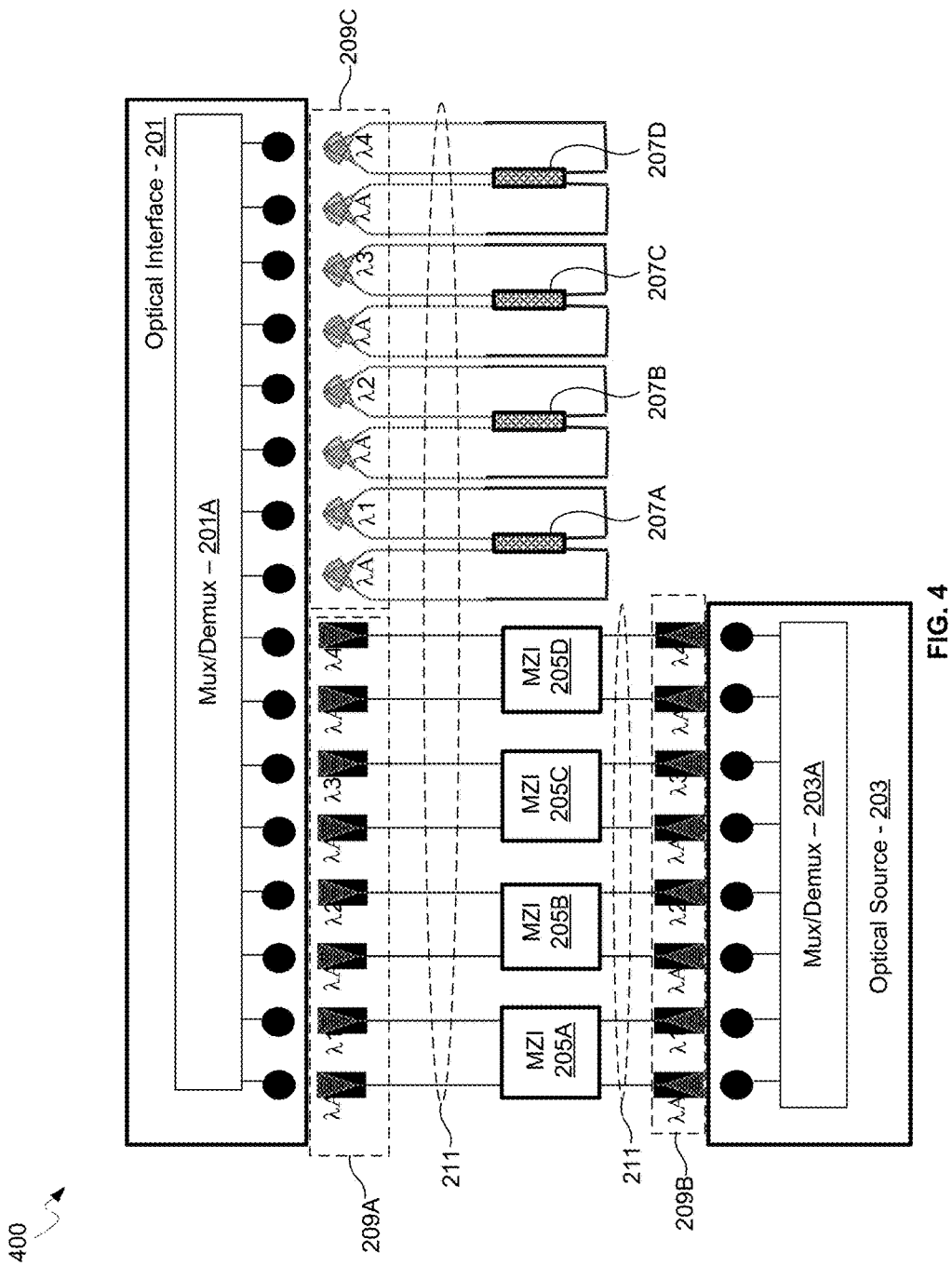
FIG. 4 illustrates a dynamically configurable mode optical transceiver, in accordance with an example embodiment of the disclosure.

FIG. 4 illustrates a dynamically configurable mode optical transceiver, in accordance with an example embodiment of the disclosure. Referring to FIG. 4, there is shown optical transceiver 400 with configurable mode, where the interface 201, source, 203, MZIs 205A-205D, photodetectors 207A-207D, and grating couplers 209A-209C are substantially similar to these elements from FIGS. 2 and 3.

In addition, FIG. 4 illustrates Mux/Demux 201A and 203A in the fiber array optical interface 201A and optical source fiber array 203, respectively. The Mux/Demux 201A and 203A may comprise optical switching capability using directional couplers and optical switches, for example, for receiving optical signals from input ports and routing them to desired output ports. The Mux/Demux 201A and 203A may be integrated in PLCs, for example, in the fiber array optical interface 201A and optical source fiber array 203, respectively.

In operation, the Mux/Demux 201A and 203A may be configured to couple optical signals between optical fibers in the fiber array optical interface 201A and optical source fiber array 203 to desired couplers 209A-209C, such that the optical transceiver 400 may operate in a desired mode, such as WDM or parallel optical fiber, for example. For example, for WDM mode such as CWDM, the Mux/Demux 203A may be configured to couple optical source signals from lasers emitting at wavelengths $\lambda 1$-$\lambda 4$ to the grating couplers 209B labeled $\lambda 1$-$\lambda 4$. Similarly, the Mux/Demux 201A may be configured to receive optical source signals from the grating couplers 209A labeled $\lambda 1$-$\lambda 4$ and also to couple modulated optical signals at wavelengths $\lambda 1$-$\lambda 4$ to the grating couplers 209C labeled $\lambda 1$-$\lambda 4$.

In an example embodiment, a method and system are disclosed for selectable parallel optical fiber and WDM operation. In this regard, aspects of the disclosure may comprise an optoelectronic transceiver integrated in a silicon photonics die, where the optoelectronic transceiver comprises optical modulators, photodetectors, grating couplers, an optical source module coupled to the photonics die, and a fiber interface coupled to the photonics die. The optoelectronic transceiver is operable to, in a first communication mode, communicate continuous wave (CW) optical signals from the optical source module to a first subset of the grating couplers for processing signals in the optical modulators in accordance with a first communications protocol, and in a second communication mode, communicate CW optical signals from the optical source module to a second subset of the grating couplers for processing signals in the optical modulators in accordance with a second communications protocol.

The processed signals may be transmitted out of the photonics die utilizing a third subset of the grating couplers. Optical signals modulated in accordance with the first communications protocol may be received from the fiber interface coupled to a fourth subset of the grating couplers or optical signals modulated in accordance with the second communications protocol may be received from the fiber interface coupled to a fifth subset of the grating couplers. Electrical signals may be generated from the received modulated optical signals utilizing the photodetectors.

The first communications protocol may be wavelength division multiplexing (WDM) and the second communications protocol may be parallel optical fiber. The fourth and fifth subset of grating couplers may be polarization splitting grating couplers and the photodetectors may be multi-port photodiodes. One of the fourth subset of grating couplers and one of the fifth subset of grating couplers may be coupled to each multi-port photodiode. The CW optical signals may be dynamically coupled to the first subset of grating couplers or the second subset of grating couplers using a multiplexer/demultiplexer in the optical source module. The optical source module may include a plurality of semiconductor lasers, a first subset of which emits at particular wavelength for the first communications protocol and a second subset of which emits at a particular wavelength for the second communications protocol. The optical modulators may be Mach-Zehnder Interferometers.

While the disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method for communication, the method comprising:
in an optoelectronic transceiver integrated in a silicon photonics die, the optoelectronic transceiver comprising optical modulators, photodetectors, optical couplers, an optical source module coupled to the photonics die, and a fiber interface coupled to the photonics die:
communicating continuous wave (CW) optical signals from the optical source module to a first subset of the optical couplers for processing signals in the optical modulators in accordance with a first communications protocol or to a second subset of the optical couplers for processing signals in the optical modulators in accordance with a second communications protocol;
transmitting processed signals out of the photonics die utilizing a third subset of the optical couplers;
in a first communication mode, receiving optical signals modulated in accordance with the first communications protocol from the fiber interface coupled to a fourth subset of the optical couplers
in a second communication mode, receiving optical signals modulated in accordance with the second communications protocol from the fiber interface coupled to a fifth subset of the optical couplers; and
generating electrical signals from the received modulated optical signals utilizing the photodetectors.

2. The method according to claim 1, wherein the first communications protocol comprises coarse wavelength division multiplexing (CWDM).

3. The method according to claim 1, wherein the second communications protocol comprises parallel single mode 4-channel (PSM-4).

4. The method according to claim 1, wherein the fourth and fifth subset of optical couplers comprise polarization splitting grating couplers.

5. The method according to claim 1, wherein the photodetectors comprise multi-port photodiodes.

6. The method according to claim 5, wherein one of the fourth subset of optical couplers and one of the fifth subset of optical couplers is coupled to each multi-port photodiode.

7. The method according to claim 1, comprising dynamically coupling the CW optical signals to the first subset of optical couplers or the second subset of optical couplers using a multiplexer/demultiplexer in the optical source module.

8. The method according to claim 1, wherein the optical source module comprises a plurality of semiconductor lasers, a first subset of which emits at wavelengths for the first communications protocol and a second subset of which emits at a wavelength for the second communications protocol.

9. The method according to claim 1, wherein the optical couplers comprise grating couplers.

10. The method according to claim 1, wherein the optical couplers comprise end facets of the photonics die.

11. A system for communication, the system comprising:
an optoelectronic transceiver integrated in a silicon photonics die, the optoelectronic transceiver comprising optical modulators, photodetectors, optical couplers, an optical source module coupled to the photonics die, and a fiber interface coupled to the photonics die, the optoelectronic transceiver being operable to:
communicate continuous wave (CW) optical signals from the optical source module to a first subset of the optical couplers for processing signals in the optical modulators in accordance with a first communications protocol or to a second subset of the optical couplers for processing signals in the optical modulators in accordance with a second communications protocol;

transmit processed signals out of the photonics die utilizing a third subset of the optical couplers;

in a first communication mode, receive optical signals modulated in accordance with the first communications protocol from the fiber interface coupled to a fourth subset of the optical couplers;

in a second communication mode, receive optical signals modulated in accordance with the second communications protocol from the fiber interface coupled to a fifth subset of the optical couplers; and generate electrical signals from the received modulated optical signals utilizing the photodetectors.

12. The system according to claim 11, wherein the first communications protocol comprises coarse wavelength division multiplexing (CWDM).

13. The system according to claim 1, wherein the second communications protocol comprises parallel single mode 4-channel (PSM-4).

14. The system according to claim 11, wherein the optical couplers comprise end facets on the photonics die.

15. The system according to claim 11, wherein the photodetectors comprise multi-port photodiodes.

16. The system according to claim 15, wherein one of the fourth subset of optical couplers and one of the fifth subset of optical couplers is coupled to each multi-port photodiode.

17. The system according to claim 11, wherein the optoelectronic transceiver is operable to dynamically couple the CW optical signals to the first subset of optical couplers or the second subset of optical couplers using a multiplexer/demultiplexer in the optical source module.

18. The system according to claim 11, wherein the optical source module comprises a plurality of semiconductor lasers, a first subset of which emits at wavelengths for the first communications protocol and a second subset of which emits at a wavelength for the second communications protocol.

19. The system according to claim 11, wherein the optical couplers comprise grating couplers and the fourth and fifth subset of optical couplers comprise polarization splitting grating couplers.

20. A system for communication, the system comprising:

an optoelectronic transceiver integrated in a silicon photonics die, the optoelectronic transceiver comprising optical modulators, photodetectors, grating couplers, an optical source module coupled to the photonics die, and a fiber interface coupled to the photonics die, the optoelectronic transceiver being operable to:

in a first communication mode, communicate continuous wave (CW) optical signals from the optical source module to a first subset of the grating couplers for processing coarse wavelength division multiplexing (CWDM) signals in a second communication mode, communicate CW optical signals from the optical source module to a second subset of the grating couplers for processing parallel single mode 4-channel (PSM-4) signals in the optical modulators;

transmit processed signals out of the photonics die utilizing a third subset of the grating couplers;

receive CWDM optical signals from the fiber interface coupled to a fourth subset of the grating couplers or receive PSM-4 optical signals from the fiber interface coupled to a fifth subset of the grating couplers; and generate electrical signals from the received modulated optical signals utilizing the photodetectors.

* * * * *